US008315218B2

(12) United States Patent
Kim et al.

(10) Patent No.: US 8,315,218 B2
(45) Date of Patent: Nov. 20, 2012

(54) METHOD FOR SUPPORTING ROUTE OPTIMIZATION IN 6LOWPAN BASED MANEMO ENVIRONMENT

(75) Inventors: Jin-Hyoung Kim, Hwaseong-si (KR); Sun-Gi Kim, Seoul (KR); Dae-Hyung Kwon, Seoul (KR); Choong-Seon Hong, Yongin-si (KR); Jin-Ho Kim, Goyang-si (KR); Byung-Goo Choi, Seoul (KR)

(73) Assignees: Samsung Electronics Co., Ltd (KR); University-Industry Cooperation Group of Kyung Hee University (KR)

( * ) Notice: Subject to any disclaimer, the term of this patent is extended or adjusted under 35 U.S.C. 154(b) by 352 days.

(21) Appl. No.: 12/702,751

(22) Filed: Feb. 9, 2010

(65) Prior Publication Data
US 2010/0202355 A1 Aug. 12, 2010

(30) Foreign Application Priority Data

Feb. 9, 2009 (KR) .......................... 10-2009-0010237

(51) Int. Cl.
*H04W 4/00* (2009.01)
(52) U.S. Cl. .......................... 370/329; 370/338; 370/341
(58) Field of Classification Search .................. None
See application file for complete search history.

(56) References Cited

U.S. PATENT DOCUMENTS

| 2004/0208144 | A1* | 10/2004 | Vinayakray-Jani | 370/331 |
| 2005/0147069 | A1* | 7/2005 | Rink et al. | 370/338 |
| 2006/0240825 | A1* | 10/2006 | Funabiki et al. | 455/436 |
| 2007/0076681 | A1* | 4/2007 | Hong et al. | 370/349 |
| 2009/0161581 | A1* | 6/2009 | Kim | 370/254 |
| 2010/0080206 | A1* | 4/2010 | Yamada | 370/338 |
| 2010/0125899 | A1* | 5/2010 | Tinnakornsrisuphap et al. | 726/12 |

* cited by examiner

*Primary Examiner* — Chi Pham
*Assistant Examiner* — Soon-Dong D Hyun
(74) *Attorney, Agent, or Firm* — The Farrell Law Firm, P.C.

(57) ABSTRACT

A method is provided for registering a mobile router in an Internet Protocol version 6 over Low power Wireless Personal Area Network (6LoWPAN) network. The mobile router detects movement into a wireless network through the reception of a beacon message, and sends a Router Solicitation (RS) message requesting registration in the wireless network to a gateway. The gateway acquires an address of the mobile router from the RS message, stores the acquired address, assigns a new address to be used in the wireless network to the mobile router, and sends a Router Advertisement (RA) message with assigned address information and gateway address information, to the mobile router. The mobile router acquires the assigned address information and the gateway address information from the RA message.

16 Claims, 14 Drawing Sheets

METHOD FOR SUPPORTING ROUTE OPTIMIZATION IN 6LOWPAN BASED MANEMO ENVIRONMENT

PRIORITY

This application claims priority under 35 U.S.C. §119(a) to a Korean Patent Application filed in the Korean Intellectual Property Office on Feb. 9, 2009 and assigned Serial No. 10-2009-0010237, the entire disclosure of which is incorporated herein by reference.

BACKGROUND OF THE INVENTION

1. Field of the Invention

The present invention relates generally to network communication, and more particularly, to a method for transmitting and receiving packets through an optimized route between nodes through the application of Mobile Adhoc for Network Mobility (MANEMO) in a sensor network consisting of Internet Protocol (IP) version 6 over Low power Wireless Personal Area Network (6LoWPAN) based sensor nodes.

2. Description of the Related Art

The interworking of IP networks is indispensable in the efficient management of a sensor network. IP version 6LoWPAN has been proposed by the Internet Engineering Task Force (IETF) Working Group for use in Transmission Control Protocol/Internet Protocol (TCP/IP) on IEEE 802.15.4. The 6LoWPAN utilizes IP version 6 (IPv6) in a low-power Wireless Personal Area Network (WPAN) that employs IEEE 802.15.4 Physical Layer/Media Access Control Layer (PHY/MAC). Generally, 6LoWPAN includes devices that operate together and are physically connected to application environments in the real world. Wireless sensors, or sensor nodes, are examples of such devices.

Network Mobility (NEMO) supports network-based mobility through the use of Mobile Routers (MRs) during network movement. NEMO provides persistent Internet connections to a variety of mobile nodes and fixed nodes that exist in subnets in the MRs. Each NEMO MR includes at least two network interfaces, which are divided into egress and ingress interfaces. An egress interface supports network mobility by accessing external networks or other NEMOs, while an ingress interface forms a subnet in the MR. NEMO may form an overlapping mobile network by accessing other NEMOs through the egress interfaces of the MRs. However, if a level of overlapping mobile networks increases, route optimization fails in a data delivery process as shown in FIG. 1. Specifically, the excess overlapping causes a pinball routing problem that may increase packet overhead in a packet tunneling process. Mobile Adhoc for NEMO (MANEMO) has been proposed to reduce overhead and transmission delay time that occur in the packet delivery process, by solving the non-optimized route problem in the overlapping NEMO networks.

FIG. 2 is a diagram illustrating a packet delivery process through MRs in a MANEMO environment.

When MANEMO performs communication between MRs belonging to an overlapping NEMO networks, it enables direct communication between the MRs through the use of an Ad-hoc routing protocol, Mobile Adhoc Network (MANET). Therefore, the bidirectional tunnel to Home Agents (HAs), which was created for communication in the NEMO environment, is not required, reducing the packet overhead that was increased due to the tunneling. In addition, the MRs in the overlapping networks directly communicate with one another using a MANET routing protocol without passing through the HAs in the IPv6 network, reducing the packet transmission delay time.

There have been many attempts to apply the MANEMO environments to the 6LoWPAN network. When 6LoWPAN MRs supporting 6LoWPAN-based network mobility has formed an overlapping network, route optimization for packet delivery may not be accomplished during communication between a Mobile Network Node (MNN) located inside the 6LoWPAN and a Correspondent Node (CN) located outside the 6LoWPAN, or communication between 6LoWPAN MNNs in different 6LoWPAN mobile networks.

When an overlapping level of a 6LoWPAN network increases and a NEMO Basic Support protocol is applied, the route for packet delivery becomes more complicated increasing the packet overhead. This occurs because all packets between an MNN and a CN are transmitted and received through a bidirectional tunnel between MRs and HAs, which prohibits the formation of an optimized route between the two nodes. Hence, even though the CN is located nearby, the packet may be routed through a long route inefficiently, increasing the transmission delay time. If the conventional MANEMO environment is applied to solve these problems, an optimized route can be determined by applying the Ad-hoc routing protocol between 6LoWPAN MRs. However, a method is not available for applying the MANEMO technology in accordance with the 6LoWPAN environment.

SUMMARY OF THE INVENTION

The present invention has been made to address at least the above problems and/or disadvantages and to provide at least the advantages described below. Accordingly, an aspect of the present invention provides a network system for forming an Ad-hoc network among 6LoWPAN MRs and thus enabling direct communication by applying a MANEMO technology in accordance with a 6LoWPAN environment.

Another aspect of the present invention provides a method for optimizing a packet transmission route between an MNN and a CN in 6LoWPAN MRs through an interworking between 6LoWPAN and MANEMO.

According to one aspect of the present invention, a method is provided for registering a mobile router in an Internet Protocol version 6 over Low power Wireless Personal Area Network (6LoWPAN) network. The mobile router detects movement into a wireless network through the reception of a beacon message and sends a Router Solicitation (RS) message requesting registration in the wireless network to a gateway. The gateway acquires an address of the mobile router from the RS message, stores the acquired address, assigns a new address to be used in the wireless network to the mobile router, and sends a Router Advertisement (RA) message with assigned address information and gateway address information to the mobile router. The mobile router acquires the assigned address information and the gateway address information from the RA message.

According to another aspect of the present invention, a method is provided for transmitting data between nodes in an Internet Protocol version 6 over Low power Wireless Personal Area Network (6LoWPAN) network. A mobile router to which a mobile network node belongs, sends a Mobile Network Prefix (MNP) request message to a gateway to determine whether a correspondent node exists in a corresponding wireless network. The gateway searches for a location of the correspondent node when the MNP request message is received, and sends an MNP reply message with an address of a mobile router to which the correspondent node belongs to the mobile router to which the mobile network node belongs, if the correspondent node exists in the wireless network. The mobile router to which the mobile network node belongs acquires the address of the mobile router to which the correspondent node belongs from the MNP reply message, establishes a communication route based on the acquired address using an Ad-hoc routing protocol, and performs a data exchange between the mobile network node and the correspondent node through the established communication route.

According to another aspect of the present invention, a method is provided for transmitting data between nodes in an Internet Protocol version 6 over Low power Wireless Personal Area Network (6LoWPAN) network. A mobile router to which a mobile network node belongs sends a Mobile Network Prefix (MNP) request message to a gateway to determine whether a correspondent node exists in a corresponding wireless network. The gateway searches for a location of the correspondent node by receiving the MNP request message, and sends an MNP reply message corresponding to the MNP request message to the mobile router to which the mobile network node belongs, if the correspondent node exists outside the wireless network. The mobile router to which the mobile network node belongs forms a tunnel to its home agent, establishes a communication route to the correspondent node, and performs a data exchange between the mobile network node and the correspondent node through the established communication route.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
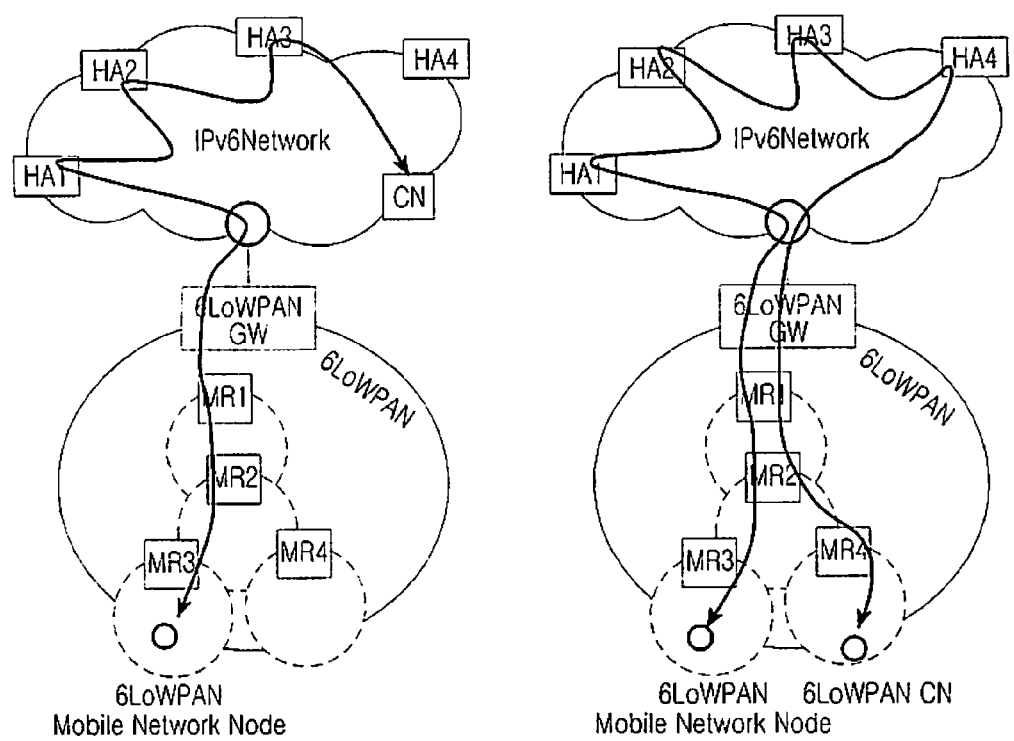
FIG. 1 is a diagram illustrating packet transmission through MRs in the conventional NEMO environment.
Figure 2:
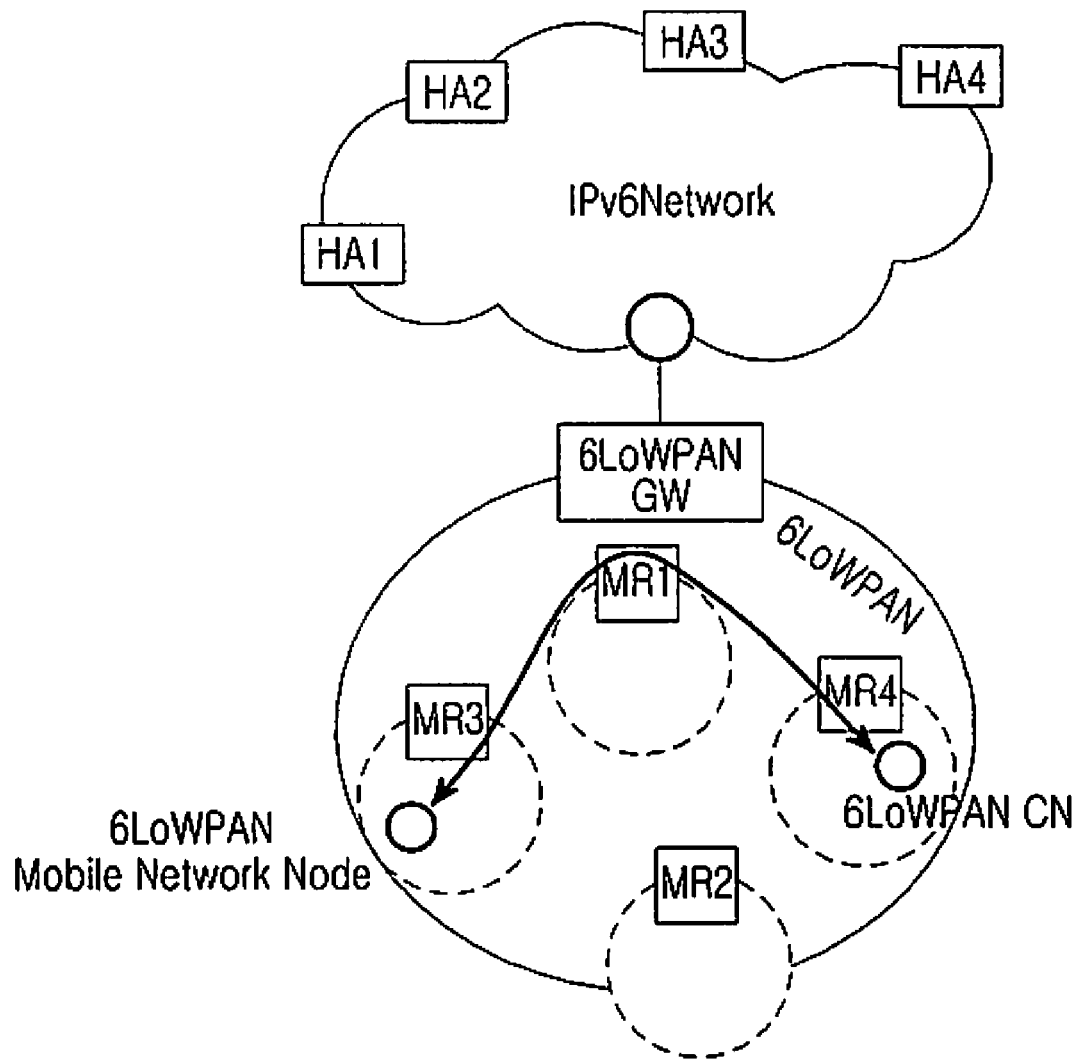
FIG. 2 is a diagram illustrating packet transmission through MRs in the conventional MANEMO environment.

Embodiments of the present invention are described in detail with reference to the accompanying drawings. The same or similar components may be designated by the same or similar reference numerals although they are illustrated in different drawings. The terms and words used in the following description and claims are not limited to their dictionary meanings, but, are used by the inventor to enable a clear and consistent understanding of the invention. Detailed descriptions of constructions or processes known in the art may be omitted to avoid obscuring the subject matter of the present invention.

Embodiments of the present invention provide a network system for forming an Ad-hoc network among 6LoWPAN MRs, thereby enabling direct communication by applying a MANEMO technology in accordance with a 6LoWPAN environment. Embodiments of the present invention also provide a method for optimizing a packet transmission route between an MNN and a CN in the 6LoWPAN MRs. A detailed description is provided of a method for registering in a new 6LoWPAN network by a 6LoWPAN MR in the 6LoW-PAN based MANEMO environment, and a method for optimizing a communication route between an MNN and a CN in the 6LoWPAN MRs.

A 6LoWPAN network, according to an embodiment of the present invention, includes a 6LoWPAN-MANEMO gateway and 6LoWPAN NEMOs. Each 6LoWPAN NEMO includes one 6LoWPAN MR and at least two 6LoWPAN MNNs. The 6LoWPAN-MANEMO gateway acts as a default gateway for the 6LoWPAN NEMOs.

Figure 3:
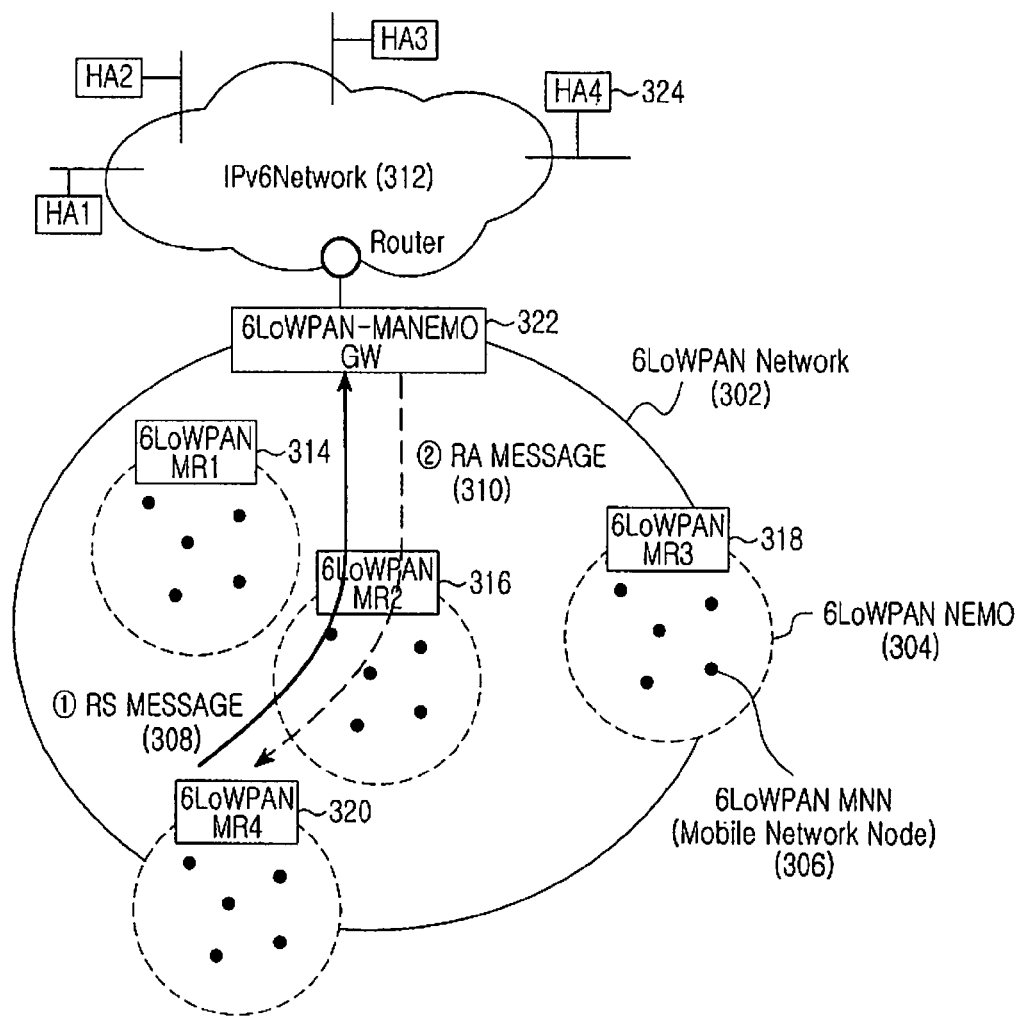
FIG. 3 is a diagram illustrating 6LoWPAN network registration of a 6LoWPAN MR through message exchange, according to an embodiment of the present invention.

FIG. 3 illustrates a 6LoWPAN network registration scenario of a 6LoWPAN MR through message exchange according to an embodiment of the present invention.

Referring to FIG. 3, a 6LoWPAN network 302 is connected to an IPv6 network 312 through a 6LoWPAN-MANEMO gateway 322. The 6LoWPAN network 302 includes 3 6LoW-PAN NEMOs 304, in which a 6LoWPAN MR1 314, a 6LoW-PAN MR2 316, and a 6LoWPAN MR3 318 are located, respectively. A 6LoWPAN MR4 320 performs a process of searching for the 6LoWPAN-MANEMO gateway 322, in order to move to and register in the 6LoWPAN network 302.

The 6LoWPAN-MANEMO gateway 322 and MRs in the 6LoWPAN network 302 send beacon messages with Personal Area Network Identifier (PAN ID) information on a broadcast basis. The 6LoWPAN MR4 320 receives the beacon message and detects its movement to the new 6LoWPAN network 302 based on the PAN ID information in the beacon message. Specifically, the 6LoWPAN MR4 320 compares the PAN ID received in the beacon message with an old PAN ID, and determines that it has moved into an area of the new 6LoW-PAN network 302 if the PAN ID in the beacon message is different from the old PAN ID.

Thereafter, the 6LoWPAN MR4 320 registers in the accessed 6LoWPAN network 302, and sends a Router Solicitation (RS) message 308 on a unicast basis to the 6LoWPAN-MANEMO gateway 322, so that it may be assigned a 16-bit address available in the PAN by the 6LoWPAN-MANEMO gateway 322. The 6LoWPAN MR2 316, which is adjacent to the 6LoWPAN MR4 320, relays the RS message 308 to the 6LoWPAN-MANEMO gateway 322.

Upon receiving the RS message 308, the 6LoWPAN-MANEMO gateway 322 acquires a 64-bit Medium Access Control (MAC) address from a MAC header in the RS message and a link-local address of a source address from an IP header in the RS message, and stores the acquired address information. Further, the 6LoWPAN-MANEMO gateway 322 acquires Mobile Network Prefix (MNP) information of the 6LoWPAN MR4 320 from an MNP option in the RS message 308, and stores the acquired information. The MNP information includes information about all nodes in the 6LoWPAN MR4 320. Thereafter, the 6LoWPAN-MANEMO gateway 322 assigns a 16-bit address unique in the current 6LoWPAN network 302 to the 6LoWPAN MR4 320, and stores the assigned address. The 6LoWPAN-MANEMO gateway 322 stores and manages information about all nodes in its 6LoWPAN network 302.

The 6LoWPAN-MANEMO gateway 322 sends a Router Advertisement (RA) message 310 to the 6LoWPAN MR4 320 on a unicast basis. The RA message 310 includes the prefix option of the 6LoWPAN network 302 and the assigned 16-bit address option.

Upon receiving the RA message 310, the 6LoWPAN MR4 320 generates a 128-bit IPv6 Care-of Address (CoA) based on the received PAN ID in the beacon message, and the prefix option and 16-bit address option in the RA message 310. The 128-bit IPv6 CoA includes a 64-bit prefix, a 16-bit PAN ID, and an address of previously specified 32 bits and newly assigned 16 bits.

The CoA is a temporary Global IPv6 address that can be used in the 6LoWPAN network 302 in which the 6LoWPAN MR4 320 is presently registered. The CoA is registered in an HA4 324 of the 6LoWPAN MR4 320 through a binding process. The CoA is used as an IPv6 address of a packet that goes out of the 6LoWPAN network 302.

The 16-bit address assigned by the 6LoWPAN-MANEMO gateway 322 is a temporary address available for communication within the 6LoWPAN network 302. For communication with another 6LoWPAN MR within the 6LoWPAN network 302, the 6LoWPAN MR4 320 does not need to deliver a packet up to its corresponding HA as in conventional NEMO technology because the 6LoWPAN MR4 320 cannot use the 16 bit address.

Figure 4:
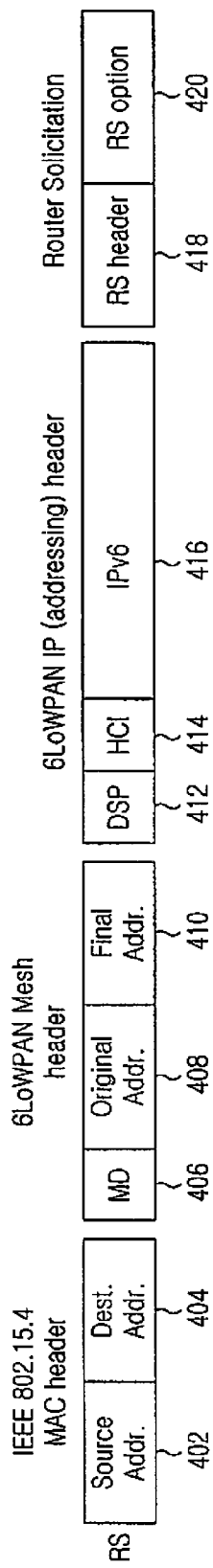
FIG. 4 is a diagram illustrating a format of an RS message sent by a 6LoWPAN MR, according to an embodiment of the present invention.

FIG. 4 illustrates the entire format of an RS message sent by a 6LoWPAN MR, according to an embodiment of the present invention.

The RS message includes an IEEE 802.15.4 MAC header, a 6LoWPAN Mesh header, a 6LoWPAN IP (addressing) header, and an RS packet.

Format data constituting the RS message is described in detail below with reference to Table 1.

TABLE 1

| Header | Field | Data | Size |
| --- | --- | --- | --- |
| IEEE 802.15.4 MAC header | Source Address | 6LoWPAN MR's 64 bits MAC address | 8 bytes |
|  | Destination Address | 6LoWPAN Intermediate MR's | 2 bytes |

TABLE 1-continued

| Header | Field | Data | Size |
| --- | --- | --- | --- |
| 6LoWPAN Mesh header | MD (Mesh Dispatch) | 16 bits MAC address original address flag = 64 bits Final address flag = 16 bits Hop Left | 1 byte |
|  | Original Address | 6LoWPAN MR's 64 bits address | 8 bytes |
|  | Final Address | 6LoWPAN-MANEMO gateway's 16 bits address (0x0001: fixed) | 2 bytes |
| 6LoWPAN IP (addressing) header | DSP (Dispatch) | Compressed IPv6 | 1 byte |
|  | HCl (IPv6 Header Compression) | Source prefix: compressed Source ID: non-compressed Destination prefix: compressed Destination ID: compressed Next Header = ICMP | 1 byte |
|  | IPv6 header | Source address: 6LoWPAN MR's link-local address (64 bits) Hop Limit (8 bits) | 9 bytes |
| Router Solicitation | RS header | Router Solicitation header | 4 bytes |
|  | RS header | Router Solicitation header | 4 bytes |
|  | RS option | MNP (Mobile Network Prefix (64 bits)) option | 12 bytes |

A Source Address field 402 of the IEEE 802.15.4 MAC header is set as a 16-bit MAC address of the 6LoWPAN MR4 320. A Destination Address field 404 is set as a 16-bit address of the adjacent 6LoWPAN MR2 316.

The RS message includes the 6LoWPAN Mesh header to perform Adaptation layer, or Layer 2 (L2), routing of the RS packet. A Mesh Dispatch (MD) field 406 of the 6LoWPAN Mesh header is defined by setting an original address flag with 64 bits and a final address flag with 16 bits. An Original Address field 408 of the 6LoWPAN Mesh header is set as the same as the 64-bit MAC address of the 6LoWPAN MR4 320. A Final Address field 410 is set as 0x0001, which is a 16-bit fixed address of the 6LoWPAN-MANEMO gateway 322.

The 6LoWPAN IP (addressing) header indicates the presence of a compressed IP header through an included Dispatch (DSP) field 412. In a Header Compression (HCl) field 414, a link-local address is included in a source address of the IP header by setting a source prefix as 'compressed', a source interface Identifier (ID) as 'non-compressed', and a destination prefix and a destination interface ID as 'compressed'.

A Next Header is set as an Internet Control Message Protocol (ICMP) to indicate that the packet is an RS packet.

Since the source interface ID of the IP header is not compressed, it includes an interface ID address of the 6LoWPAN MR4 320. The source prefix and the destination prefix can be compressed, since they are expressed as FE80::/64, which is an identifier indicating a link-local prefix.

The entire RS packet is generated by inserting an RS header field 418 after an IPv6 header field 416 and including an MNP option of the 6LoWPAN MR4 320 in an RS option field 420.

Figure 5:
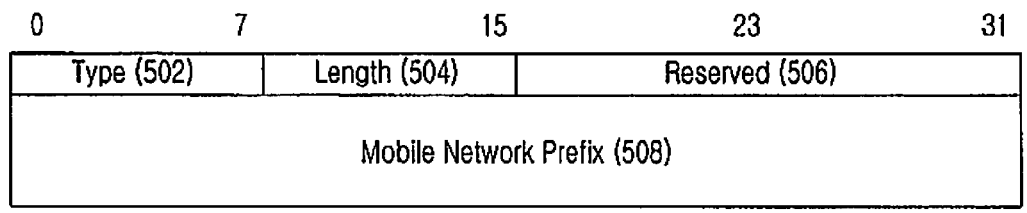
FIG. 5 is a diagram illustrating a format of an MNP option, according to an embodiment of the present invention.

FIG. 5 illustrates a format of an MNP option, according to an embodiment of the present invention.

The MNP option includes an 8-bit Type field 502, an 8-bit Length field 504, a 16-bit Reserved field 506, and a 64-bit MNP field 508.

Figure 6:
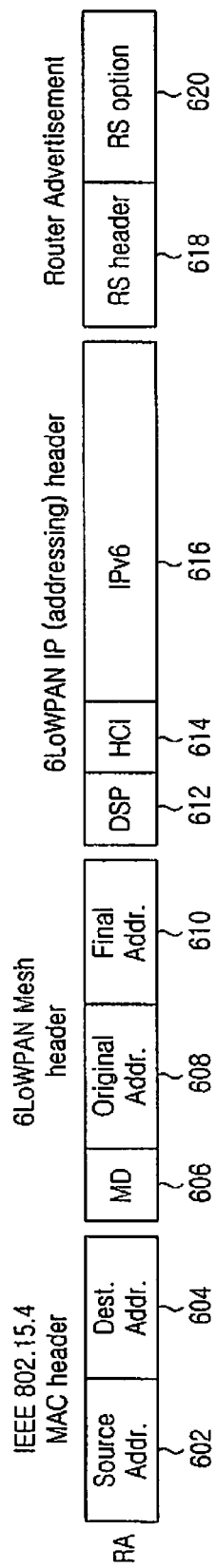
FIG. 6 is a diagram illustrating a format of an RA message sent by a 6LoWPAN-MANEMO gateway, according to an embodiment of the present invention.

FIG. 6 illustrates the entire format of an RA message received by a 6LoWPAN MR, according to an embodiment of the present invention.

The RA message includes an IEEE 802.15.4 MAC header, a 6LoWPAN Mesh header, a 6LoWPAN IP (addressing) header, and an RA packet.

Format data constituting the RA message is described in detail below with reference to Table 2.

TABLE 2

| Header | Field | Data | Size |
|---|---|---|---|
| IEEE 802.15.4 MAC header | Source Address | 6LoWPAN-MANEMO Gateway's 16 bits MAC address | 2 bytes |
| | Destination Address | 6LoWPAN Intermediate MR's 16 bits MAC address | 2 bytes |
| 6LoWPAN Mesh header | MD (Mesh Dispatch) | Original address flag = 16 bits Final address flag = 64 bits Hop Left | 1 byte |
| | Original Address | 6LoWPAN-MANEMO Gateway's 16 bits address (0x0001: fixed) | 2 bytes |
| | Final Address | 6LoWPAN MR's 64 bits address | 8 bytes |
| 6LoWPAN IP (addressing) header | DSP (Dispatch) | Compressed IPv6 | 1 byte |
| | HC1 (IPv6 Header Compression) | Source prefix: compressed Source IID: non-compressed, Destination prefix: compressed Destination IID: non-compressed Next Header = ICMP | 1 byte |
| | IPv6 header | Source address: 6LoWPAN-MANEMO Gateway's link-local address (64 bits) Destination address: 6LoWPAN MR's link-local address (64 bits) Hop Limit (8 bits) | 17 bytes |
| Router Advertisement | RA header | Router Advertisement header | 16 bytes |
| | RA option | Prefix (64 bits) option 6LoWPAN MR's 16 bits address option | 16 bytes |

A Source Address field 602 of the IEEE 802.15.4 MAC header is set as a 16-bit MAC address of the 6LoWPAN-MANEMO gateway 322. A Destination Address field 604 is set as a 16-bit MAC address of the adjacent 6LoWPAN MR2 316. Like the RS packet, the RA packet includes the 6LoWPAN Mesh header to perform L2 routing on the RA packet.

An MD field 606 of the 6LoWPAN Mesh header is defined by setting an original address flag with 16 bits and a final address flag with 64 bits. An Original Address field 608 of the 6LoWPAN Mesh header is set as a 16-bit MAC address of the 6LoWPAN-MANEMO gateway 322. A Final Address field 610 is set as a 64-bit MAC address of the 6LoWPAN MR4 320 since the 6LoWPAN-MANEMO gateway 322 stored the address of the 6LoWPAN MR4 320 when it received the RS packet. Therefore, the 6LoWPAN-MANEMO gateway 322 can deliver the RA packet to the 6LoWPAN MR4 320 on a unicast basis.

The 6LoWPAN IP (addressing) header indicates the presence of a compressed IPv6 header through an included DSP field 612. In an HC1 field 614, a source prefix and a destination prefix are set as 'compressed', because these prefixes are equally set as FE80::/64 as a link-local address.

A link-local address is included in the source and destination addresses of the IP header by setting a source interface ID and a destination interface ID as 'non-compressed'.

A Next Header is set as ICMP to indicate that the packet is an RA packet.

A source interface ID of the IPv6 header includes an interface ID address of the 6LoWPAN-MANEMO gateway 322 since it is not compressed. A destination interface ID is set as a link-local address of the 6LoWPAN MR4 320. The entire RA packet is generated by inserting an RA header field 618 after an IPv6 header field 616 and including a prefix option and an assigned 16-bit address option of the 6LoWPAN MR4 320 in an RA option field 620.

Figure 7:
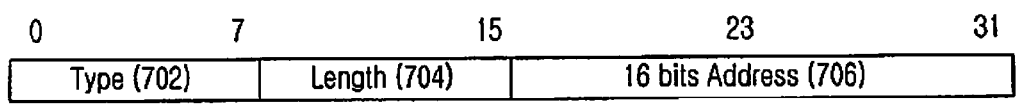
FIG. 7 is a diagram illustrating a format of a 6LoWPAN 16-bit address option in an RA message, according to an embodiment of the present invention.

FIG. 7 illustrates a format of a 6LoWPAN 16-bit address option that is included in an RA message, according to an embodiment of the present invention.

The 6LoWPAN 16-bit address option includes an 8-bit Type field 702, an 8-bit Length field 704, and a 16-bit Reserved field 706.

As described above, when a 6LoWPAN MR moves to a new 6LoWPAN network, the 6LoWPAN MR may register in the new 6LoWPAN network by exchanging RS and RA messages with the 6LoWPAN-MANEMO gateway.

After entering a new 6LoWPAN network 302 and completing a process of searching for a 6LoWPAN-MANEMO gateway 322, a 6LoWPAN MR4 320 establishes a communication route between an MNN (or a source node) in the 6LoWPAN MR4 320 and a CN (or a destination node) in a 6LoWPAN MR3 312.

Figure 8:
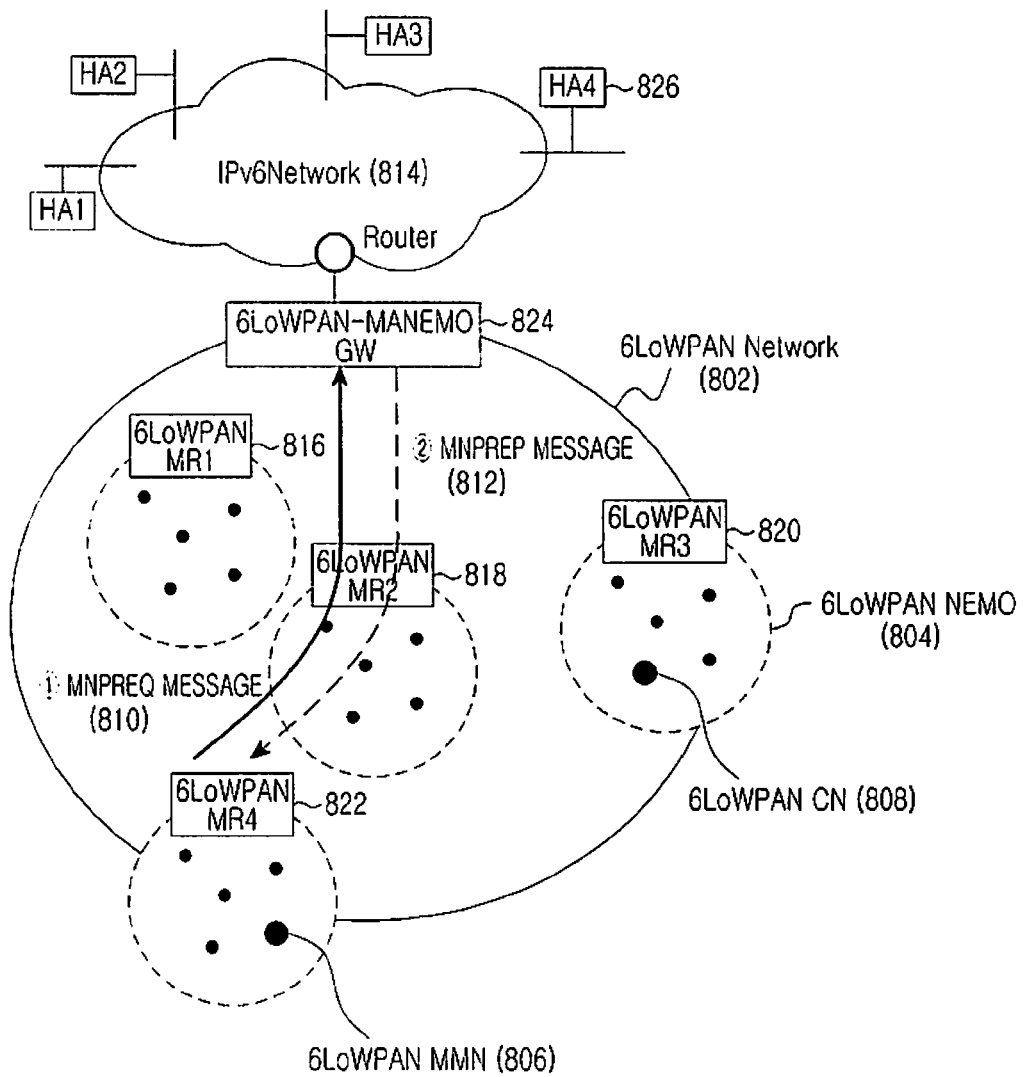
FIG. 8 is a diagram illustrating an MNP search of a 6LoW-PAN MR through message exchange, according to an embodiment of the present invention.

Referring now to FIG. 8, a diagram illustrates an MNP search of a 6LoWPAN MR through message exchange, according to an embodiment of the present invention. Referring to FIG. 8, a 6LoWPAN network 802 is connected to an IPv6 network 814 through a 6LoWPAN-MANEMO gateway 824. The 6LoWPAN network 802 includes 3 6LoWPAN NEMOs 804, in which a 6LoWPAN MR1 816, a 6LoWPAN MR2 818, and a 6LoWPAN MR3 820 are located, respectively.

If a 6LoWPAN MR4 822 moves into the new 6LoWPAN network 802 and completes its registration in the 6LoWPAN-MANEMO gateway 824, an MNN 806 in the 6LoWPAN MR4 822 communicates with a CN 808 in the 6LoWPAN MR3 820. For communication with the CN 808, the 6LoWPAN MR4 822 performs an MNP search process for determining whether the CN 808 is located inside or outside of the 6LoWPAN network 802.

If the CN 808 is located in the 6LoWPAN MR3 820 that is located in the 6LoWPAN network 802, the 6LoWPAN MR4 822 may exchange packets with the 6LoWPAN MR3 820 through a route optimized by the MNP search process without forming a tunnel to an HA4 826.

If a packet, which has a source address indicating the 6LoWPAN MNN 806 and a destination address indicating the CN 808, passes through an ingress interface of the 6LoWPAN MR4 822, the 6LoWPAN MR4 822 checks a prefix of the destination address and an external node mapping table and determines whether there is any identical prefix. Specifically, the 6LoWPAN MR4 822 determines whether the CN 808 is a node that exists in a 6LoWPAN NEMO 804 to which the 6LoWPAN MR4 822 belongs.

If an identical prefix is not detected, the 6LoWPAN MR4 822 sends an message to the 6LoWPAN-MANEMO gateway 824 inquiring whether the prefix is located in the current 6LoWPAN network 802. Specifically, the 6LoWPAN MR4 822 generates a Mobile Network Prefix Request (MNPREQ) message 810 containing prefix information of the CN 808, and sends it to the 6LoWPAN-MANEMO gateway 824 on a unicast basis.

Upon receiving the MNPREQ message 810, the 6LoWPAN-MANEMO gateway 824 searches a stored mapping table to determine whether a prefix of the CN 808 exists in the current 6LoWPAN network 802. Since the 6LoWPAN-MANEMO gateway 824 stores information about all 6LoWPAN nodes in the 6LoWPAN network 802 and 6LoWPAN MRs having the MNP, the 6LoWPAN-MANEMO gateway 824 can determine whether the prefix of the CN 808 is located inside or outside of the 6LoWPAN network 802.

If the prefix of the CN 808 is detected, 6LoWPAN-MANEMO gateway 824 generates a Mobile Network Prefix Reply (MNPREP) message 812 and sends it to the 6LoWPAN MR4 822 on a unicast basis. The MNPREP message 812 includes a 16-bit address of a Correspondent 6LoWPAN MR (CMR), i.e., a 16-bit address of the 6LoWPAN MR3 820 to which the CN 808 belongs.

Upon receiving the MNPREP message 812, the 6LoWPAN MR4 822 implements a routing protocol for securing a route optimized between the 6LoWPAN MR4 822 and the 6LoWPAN MR3 820 based on the 16-bit address information of the 6LoWPAN MR3 820. Specifically, the 6LoWPAN MR4 822 sends a Route REQuest (RREQ) message to neighbor nodes on a broadcast basis using an Ad-hoc routing protocol. The 6LoWPAN MR3 820 sends a Route Reply (RREP) message to the 6LoWPAN MR4 822 on a unicast basis in response to the received RREQ message. If the route between the 6LoWPAN MR4 822 and the 6LoWPAN MR3 820 is secured in this way, the packet between the 6LoWPAN MNN 806 and the CN 808 is exchanged through an optimized route.

Figure 9:
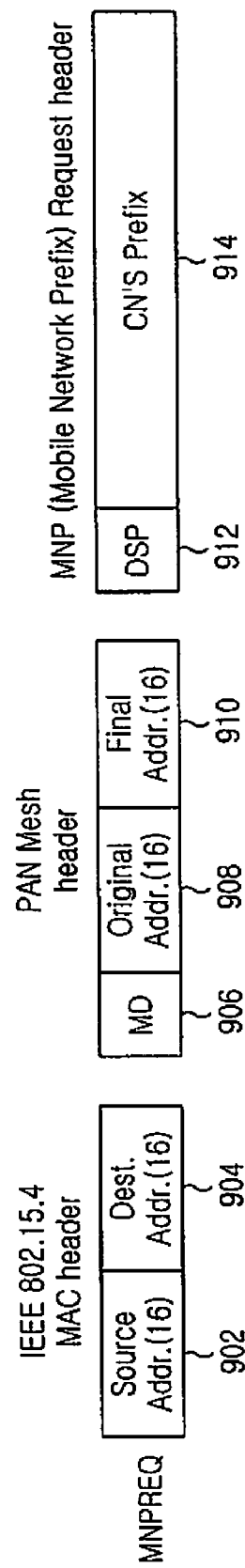
FIG. 9 is a diagram illustrating a format of an MNPREQ message sent by a 6LoWPAN MR, according to an embodiment of the present invention.

FIG. 9 illustrates the format of a MNPREQ message sent by a 6LoWPAN MR, according to an embodiment of the present invention.

The MNPREQ message includes an IEEE 802.15.4 MAC header, a 6LoWPAN Mesh header, and an MNP Request header.

Format data constituting the MNPREQ message is described in detail below with reference to Table 3.

TABLE 3

| Header | Field | Data | Size |
| --- | --- | --- | --- |
| IEEE 802.15.4 MAC header | Source Address | 6LoWPAN MR's 16 bits MAC address | 2 byte |
|  | Destination Address | 6LoWPAN Intermediate MR's 16 bits MAC address | 2 byte |
| 6LoWPAN Mesh header | MD (Mesh Dispatch) | original address flag = 16 bits Final address flag = 16 bits Hop Left | 1 byte |
|  | Original Address | 6LoWPAN MR's 16 bits address | 2 byte |
|  | Final Address | 6LoWPAN-MANEMO Gateway's 16 bits address | 2 byte |
| MNP Request Header | DSP (Dispatch) | MNP Request (00 000001) | 1 byte |
|  | MNP Request | CN's Prefix | 8 bytes |

A Source Address field 902 of the IEEE 802.15.4 MAC header is set as a 16-bit MAC address of the 6LoWPAN MR4 822. A destination address is set as a 16-bit MAC address of another 6LoWPAN MR 816, 818. Specifically, the destination address is set as adjacent 6LoWPAN MR2 818. The 6LoWPAN Mesh header is included to perform L2 routing on the MNPREQ packet. An MD field 906 of the 6LoWPAN Mesh header is defined by setting an original address flag with 16 bits and a final address flag with 16 bits. An Original Address field 908 of the 6LoWPAN Mesh header is set as the 16-bit MAC address of the 6LoWPAN MR4 822. A Final Address field 910 is set as a 16-bit address of the 6LoWPAN-MANEMO gateway 824.

A value of a DSP field 912 of the MNP Request header is set as "00 000001" to indicate the present of a MNPREQ header. The entire MNPREQ packet is generated by inserting a 64-bit CN's Prefix field 914 after the 1-byte DSP field 912.

Figure 10:
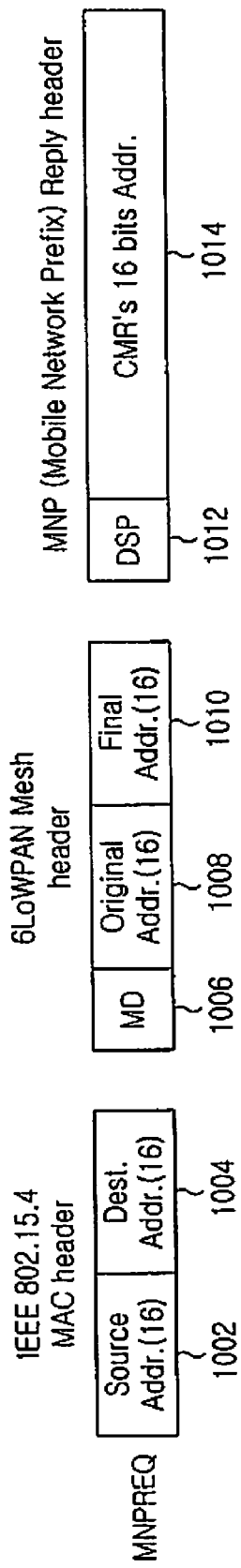
FIG. 10 is a diagram illustrating a format of an MNPREP message sent by a 6LoWPAN-MANEMO gateway, according to an embodiment of the present invention.

FIG. 10 illustrates the format of an MNPREP packet transmitted by a 6LoWPAN-MANEMO gateway, according to an embodiment of the present invention.

The MNPREP message includes an IEEE 802.15.4 MAC header, a 6LoWPAN Mesh header and an MNP Reply header.

Format data constituting the MNPREP message is described in detail below with reference to Table 4.

TABLE 4

| Header | Field | Data | Size |
| --- | --- | --- | --- |
| IEEE 802.15.4 MAC header | Source Address | 6LoWPAN-MANEMO Gateway's 16 bits MAC address | 2 byte |
|  | Destination Address | 6LoWPAN Intermediate MR's 16 bits MAC address | 2 byte |
| 6LoWPAN Mesh header | MD (Mesh Dispatch) | original address flag = 16 bits Final address flag = 16 bits Hop Left | 1 byte |
|  | Original Address | 6LoWPAN-MANEMO Gateway's 16 bits address | 2 byte |
|  | Final Address | 6LoWPAN MR's 16 bits address | 2 byte |
| MNP Reply Header | DSP (Dispatch) | MNP Reply(00 000010) | 1 byte |
|  | MNP Reply | CMR's 16 bits address | 2 bytes |

A Source Address field 1002 of the IEEE 802.15.4 MAC header is set as a 16-bit MAC address of the 6LoWPAN-MANEMO gateway 824. A destination address is set as a 16-bit MAC address of the adjacent 6LoWPAN MR2 818.

The 6LoWPAN Mesh header is included to perform L2 routing on the MNPREP packet. An MD field 1006 of the 6LoWPAN Mesh header is defined by setting an original address flag with 16 bits and a final address flag with 16 bits. An Original Address field 1008 of the 6LoWPAN Mesh header is set as the 16-bit MAC address of the 6LoWPAN-MANEMO gateway 824. A Final Address field 1010 is set as a 16-bit address of the 6LoWPAN MR4 822.

A value of a DSP field 1012 of the MNPREP Reply header is set as "00 000010" to indicate the presence of an MNPREP header. The entire MNPREP packet is generated by inserting a CMR's 16-bit address field 1014 after the 1-byte DSP field 1012.

After the 6LoWPAN-MANEMO gateway search process and the MNP search process are completed, the 6LoWPAN MR4 822 can acquire an address of the 6LoWPAN MR3 820 where the CN is located.

Figure 11:
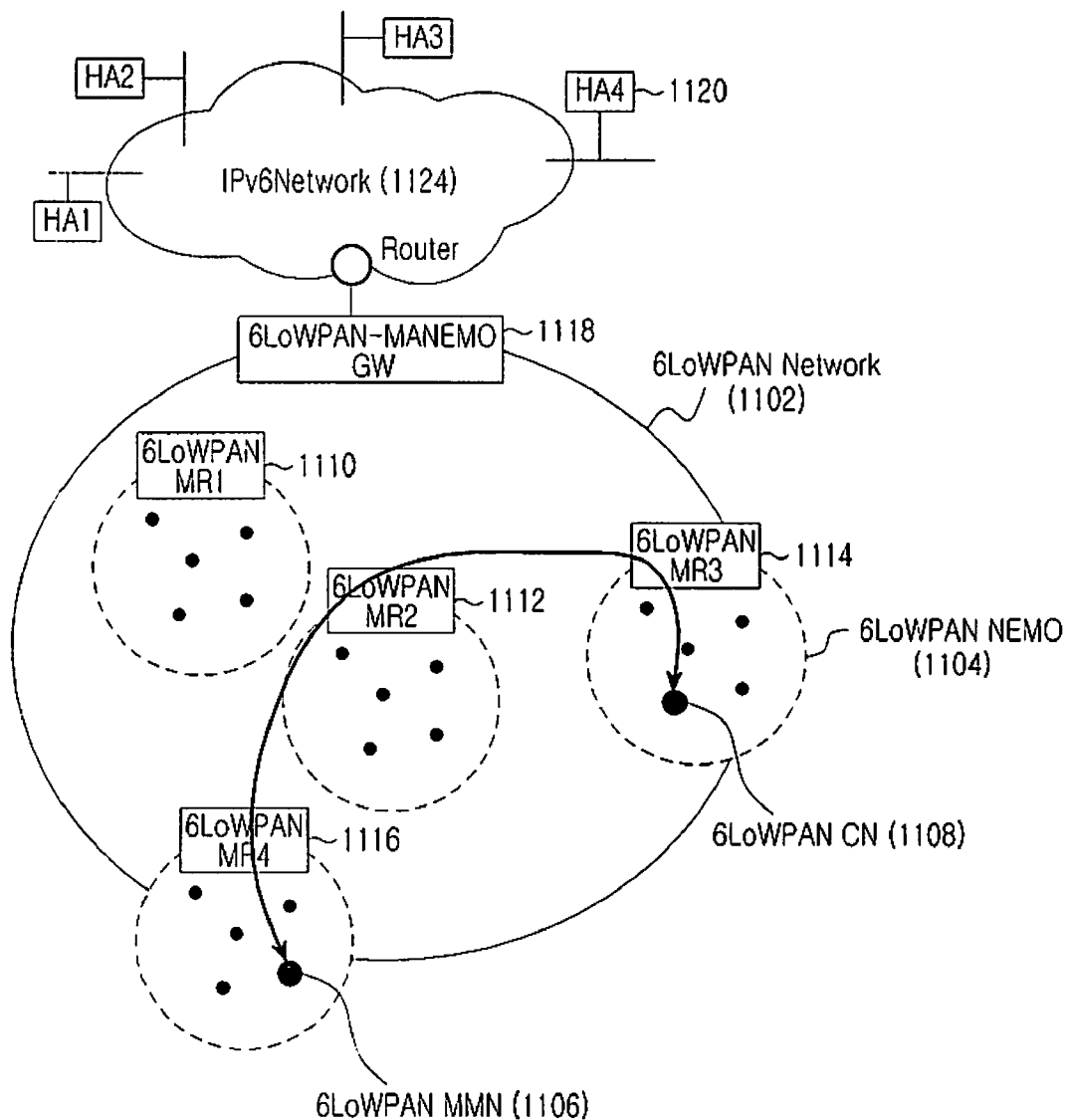
FIG. 11 is a diagram illustrating a packet route between a 6LoWPAN MNN and a 6LoWPAN CN, which are located in the same 6LoWPAN network, according to an embodiment of the present invention.

Referring now to FIG. 11, a diagram illustrates a packet route between a 6LoWPAN MNN and a 6LoWPAN CN, which are located in the same 6LoWPAN network, according to an embodiment of the present invention. Specifically, FIG. 11 is set up in a manner similar to that of FIG. 8, and includes a 6LoWPAN Network 1102, 6LoWPAN NEMO 1104, 6LoWPAN MRs 1110, 1112, 1114 and 1116, a 6LoWPAN-MANEMO Gateway 1118, and an IPv6 Network 1124.

The 6LoWPAN MR4 1116 may establish an optimized packet route between 6LoWPAN MRs using an MANET routing protocol, without forming a bidirectional tunnel to an HA4 1120. Specifically, the 6LoWPAN MR4 1116 sends an RREQ message to neighbor nodes on a broadcast basis using the MANET routing protocol. The 6LoWPAN MR3 1114 sends an RREP message to the 6LoWPAN MR4 1116 on a unicast basis in response to the received RREQ message. If a route between the 6LoWPAN MR4 1116 and the 6LoWPAN MR3 1114 is secured in this way, a 6LoWPAN MNN 1106 and a CN 1108 exchange packets through the route.

Figure 12:
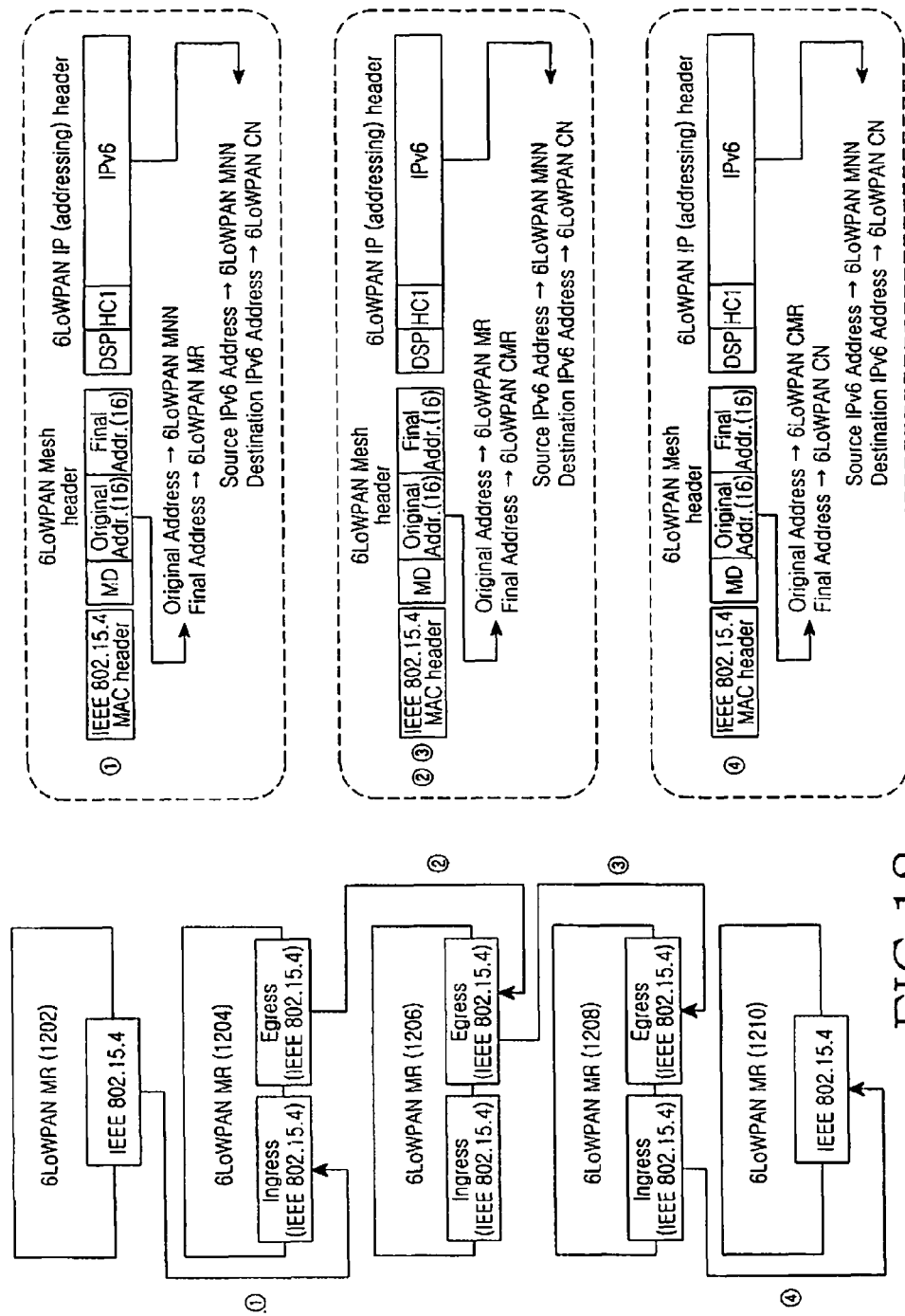
FIG. 12 is a diagram illustrating a format of a 6LoWPAN packet in each of a 6LoWPAN MNN and a 6LoWPAN CN, which are located in the same 6LoWPAN network, according to an embodiment of the present invention.

FIG. 12 illustrates a detailed format of a 6LoWPAN packet in both a 6LoWPAN MNN and a 6LoWPAN CN, which are located in the same 6LoWPAN network, according to an embodiment of the present invention.

A source address of every IPv6 packet indicates 6LoWPAN MNN 1202 and a destination address indicates a 6LoWPAN CN 1204. The packet is delivered through a route optimized using a 6LoWPAN Mesh header.

Reference numeral (1) in FIG. 12 indicates a packet format between a 6LoWPAN MNN 1202 and a 6LoWPAN MR 1204. The 6LoWPAN MNN 1202 transmits the packet after setting an original address of a Mesh header as the 6LoWPAN MNN 1202 and a final address as the 6LoWPAN MR 1204, and the packet is received at an ingress interface of the 6LoWPAN MR 1204. Further, the packet is delivered to an egress interface of the 6LoWPAN MR 1204 to be forwarded to another 6LoWPAN Intermediate Mobile Router (IMR) 1206.

Reference numerals (2) and (3) indicate packet formats between 6LoWPAN MRs. The 6LoWPAN MR 1206 transmits a packet after setting an original address of a Mesh header as the 6LoWPAN MR 1206 and a final address as the 6LoWPAN CMR 1208, and the packet is received at an egress interface of the 6LoWPAN CMR 1208 after being relayed by the 6LoWPAN IMR 1206.

Reference numeral (4) indicates a packet format between the 6LoWPAN CMR 1208 and a 6LoWPAN CN 1210. The 6LoWPAN CMR 1208 delivers the received packet to its ingress interface in order to forward it to the 6LoWPAN CN 1210.

Finally, the 6LoWPAN CN 1210 receives the packet transmitted from the 6LoWPAN MNN 1202, through the ingress interface of the 6LoWPAN CMR 1208.

Figure 13:
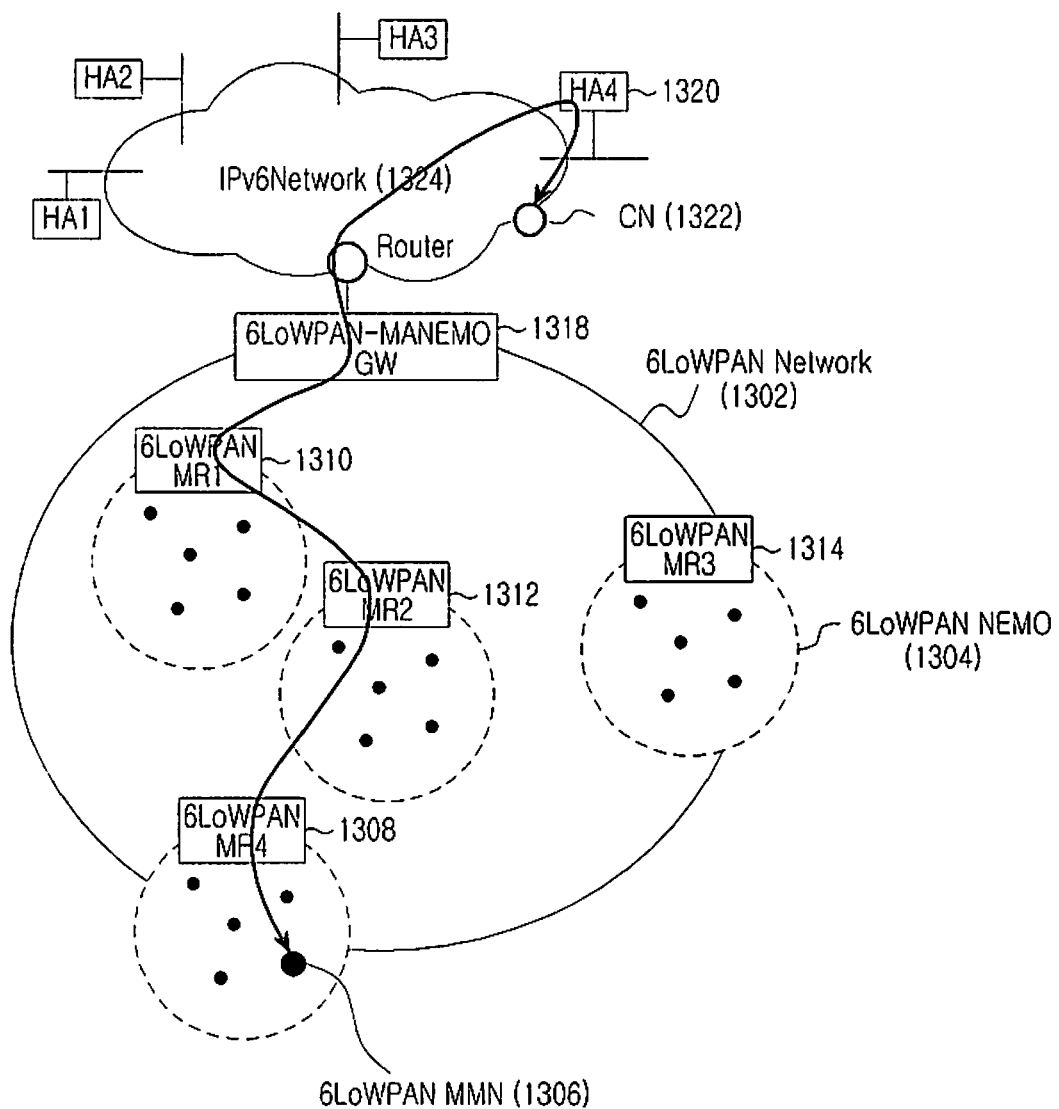
FIG. 13 is a diagram illustrating a packet route between a 6LoWPAN MNN and a 6LoWPAN CN, which are located in different 6LoWPAN networks, according to an embodiment of the present invention.

Referring now to FIG. 13, a diagram illustrates a packet route between a 6LoWPAN MNN and a 6LoWPAN CN, which are located in different 6LoWPAN networks, according to an embodiment of the present invention. Specifically, FIG. 13 is set up in a manner similar to that of FIG. 11, and includes a 6LoWPAN Network 1302, 6LoWPAN NEMO 1304, 6LoWPAN MRs 1310, 1312, 1314 and 1316, a 6LoWPAN-MANEMO Gateway 1318, and an IPv6 Network 1324.

6LoWPAN MRs, according to an embodiment of the present invention, form an Ad-hoc type MANET without forming an overlapping network. Thus, direct packet transmission and reception is possible between the 6LoWPAN MRs. A 6LoWPAN MR4 1308 forms a bidirectional tunnel to its corresponding HA4 1320 without passing through HAs of all 6LoWPAN MRs, thereby reducing tunnel overhead and packet route. Therefore, a 6LoWPAN MNN 1306 can deliver a packet to a CN 1322 existing in another 6LoWPAN network through an optimized route.

Figure 14:
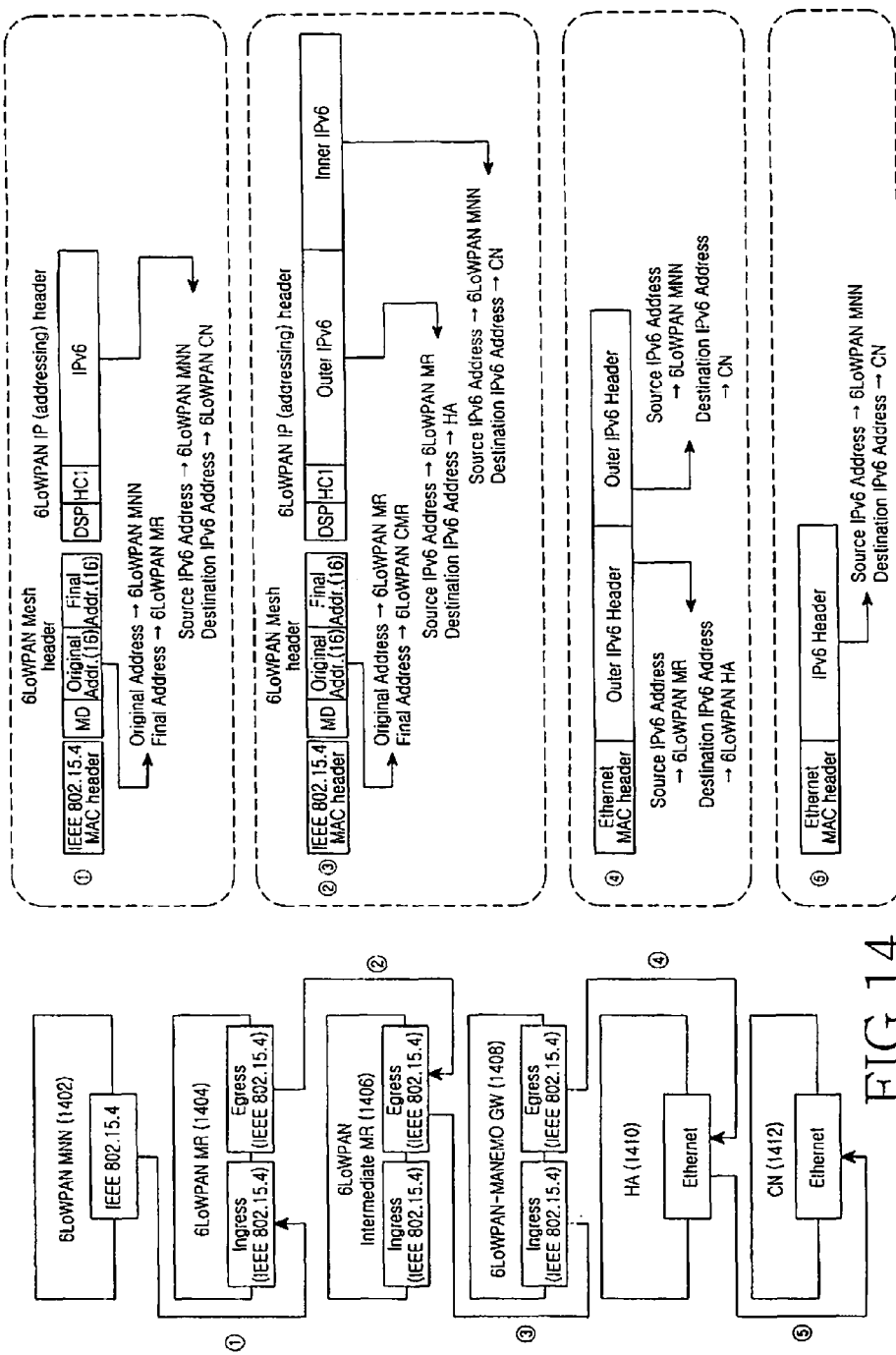
FIG. 14 is a diagram illustrating formats of a 6LoWPAN packet and an IPv6 packet in each of a 6LoWPAN MNN and a 6LoWPAN CN, which are located in different 6LoWPAN networks, according to an embodiment of the present invention.

FIG. 14 illustrates detailed formats of a 6LoWPAN and an IPv6 packet in each of a 6LoWPAN MNN and a 6LoWPAN CN, which are located in different 6LoWPAN networks, according to an embodiment of the present invention.

In an embodiment of the present invention, since a bidirectional tunnel is established between a 6LoWPAN MR 1404 and an HA 1410, two IPv6 headers are included between two nodes for tunneling. A source address of an outer IPv6 header is set as the 6LoWPAN MR 1404, and a destination address is set as the HA 1410. A source address of an inner IPv6 header is set as a sender or a 6LoWPAN MNN 1402, and a destination address is set as a recipient or a CN 1412.

Reference numeral (1) in FIG. 14 indicates a packet format between the 6LoWPAN MNN 1402 and the 6LoWPAN MR 1404. The 6LoWPAN MNN 1402 sends a packet after setting an original address or a Mesh header as the 6LoWPAN MNN 1402 and a final address as the 6LoWPAN MR 1404, and the packet is received at an ingress interface of the 6LoWPAN MR 1404. Thereafter, the packet is delivered to an egress interface of the 6LoWPAN MR 1404 to be forwarded to another 6LoWPAN IMR 1406.

Reference numerals (2) and (3) indicate packet formats between the 6LoWPAN MR 1406 and a 6LoWPAN-MANEMO gateway 1408. The 6LoWPAN MR 1406 sends a packet after setting an original address of a Mesh header as the 6LoWPAN MR 1406 and a final address as the 6LoWPAN-MANEMO gateway 1408, and the packet is forwarded to the 6LoWPAN-MANEMO gateway 1408 after being relayed the 6LoWPAN IMR 1406.

Reference numeral (4) indicates a packet format between the 6LoWPAN-MANEMO gateway 1408 and the HA 1410. Upon receiving a packet originating from the 6LoWPAN MR 1404, the 6LoWPAN-MANEMO gateway 1408 decompresses a compressed IP header and converts it into an IPv6 packet. Thereafter, the 6LoWPAN-MANEMO gateway 1408 forwards the IPv6 packet to the HA 1410.

Reference numeral (5) indicates a packet format between the HA 1410 and the CN 1412. The HA 1410 receives the packet through a tunnel interface with the 6LoWPAN MR 1404, and delivers the received packet to the final destination or the CN 1412 after decapsulating the packet.

Through the aforementioned method, the 6LoWPAN MNN establishes an optimized communication route to the CN, and transmits and receives packets through the established route in the 6LoWPAN based MANEMO environments.

As is apparent from the foregoing description, embodiments of the present invention provide a method for establishing a communication route between nodes in the 6LoWPAN based MANEMO environment, thereby optimizing a packet transmission route between the 6LoWPAN MNN and the 6LoWPAN CN.

In addition, embodiments of the present invention construct a network so as to enable direction communication by forming an Ad-hoc network among 6LoWPAN MRs, thereby reducing tunneling overhead, optimizing the communication route and minimizing a packet delay time in the NEMO environment.

In the foregoing description, embodiments of the present invention provide, by way of example, a method for registering in a new 6LoWPAN network by a 6LoWPAN MR in a 6LoWPAN based MANEMO environment and a method for establishing an optimized communication route between an MNN and a CN in the 6LoWPAN MRs.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for registering a mobile router in an Internet Protocol version 6 over Low power Wireless Personal Area Network (6LoWPAN) network, comprising:

detecting movement into a wireless network through the reception of a beacon message by the mobile router;

sending, by the mobile router, a Router Solicitation (RS) message to a gateway requesting registration in the wireless network so that the gateway can acquire an address of the mobile router from the RS message, store the acquired address, and assign a new address to the mobile router for use in the wireless network;

receiving, by the mobile router, a Router Advertisement (RA) message comprising assigned address information and gateway address information from the gateway; and acquiring, by the mobile router, the assigned address information and the gateway address information from the RA message, wherein the address of the mobile router comprises at least one of a Medium Access Control (MAC) address acquired from a MAC header in the RS message and a source link-local address acquired from an IP header in the RS message.

2. The method of claim 1, wherein detecting movement comprises detecting movement into the wireless network by the mobile router using a Personal Area Network Identifier (PAN ID) in the beacon message.

3. The method of claim 1, wherein the RS message comprises a Mobile Network Prefix (MNP) option having information about nodes belonging to the mobile router.

4. The method of claim 1, further comprising mapping and storing, by the gateway, the MAC address and Mobile Network Prefix (MNP) information of the mobile router using the RS message.

5. The method of claim 1, wherein the RS message and the RA message are sent and received on a unicast basis.

6. The method of claim 1, wherein the new address assigned to the mobile router has 16 bits.

7. The method of claim 1, wherein the wireless network is a 6LoWPAN network.

8. A method for transmitting data between nodes in an Internet Protocol version 6 over Low power Wireless Personal Area Network (6LoWPAN) network, comprising:

sending, by a mobile router to which a mobile network node belongs, a Mobile Network Prefix (MNP) request message to a gateway so that the gateway can search for a location of a correspondent node, when the MNP request message is received, and determine whether the correspondent node exists in a corresponding wireless network;

receiving, by the mobile router to which the mobile network node belongs, an MNP reply message with an address of a mobile router to which the correspondent node belongs, from the gateway, if the correspondent node exists in the wireless network;

acquiring, by the mobile router to which the mobile network node belongs, the address of the mobile router to which the correspondent node belongs, from the MNP reply message; and establishing, by the mobile router to which the mobile network node belongs, a communication route based on the acquired address using an Ad-hoc routing protocol, and performing a data exchange between the mobile network node and the correspondent node through the established communication route.

9. The method of claim 8, wherein the MNP request message comprises an MNP option and the gateway searches for the location of the correspondent node by detecting a prefix matching the MNP option.

10. The method of claim 8, wherein the MNP request message and the MNP reply message are sent on a unicast basis.

11. The method of claim 8, wherein establishing the communication route comprises establishing, by the mobile router to which the mobile network node belongs, the communication route by exchanging a Route REQuest (RREQ) message and a Route Reply (RREP) message with the mobile router to which the correspondent node belongs.

12. The method of claim 8, wherein the wireless network is a 6LoWPAN network.

13. A method for transmitting data between nodes in an Internet Protocol version 6 over Low power Wireless Personal Area Network (6LoWPAN) network, comprising:

sending, by a mobile router to which a mobile network node belongs, a Mobile Network Prefix (MNP) request message to a gateway so that the gateway can search for a location of a correspondent node, when the MNP request message is received, and determine whether the correspondent node exists in a corresponding wireless network;

receiving, by the mobile router to which the mobile network node belongs, an MNP reply message corresponding to the MNP request message from the gateway, if the correspondent node exists outside the wireless network;

forming, by the mobile router to which the mobile network node belongs, a tunnel to a corresponding home agent, and establishing a communication route to the correspondent node; and exchanging data between the mobile network node and the correspondent node through the established communication route.

14. The method of claim 13, wherein the MNP request message comprises an MNP option and the gateway searches for the location of the correspondent node by detecting a prefix matching the MNP option.

15. The method of claim 13, wherein the MNP request message and the MNP reply message are sent on a unicast basis.

16. The method of claim 13, wherein the wireless network is a 6LoWPAN network.

\* \* \* \* \*